United States Patent [19]

Schultz

[11] 4,270,300
[45] Jun. 2, 1981

[54] ANIMAL TRAP AND TRIGGER MECHANISM

[76] Inventor: Daryl A. Schultz, R.R. 2, Box 92-A, Rensselaer, Ind. 47979

[21] Appl. No.: 79,732

[22] Filed: Sep. 28, 1979

[51] Int. Cl.³ .......................................... A01M 23/24
[52] U.S. Cl. ..................................................... 43/82
[58] Field of Search ...................... 43/81, 81.5, 82, 85, 43/88–93, 94

[56] References Cited

U.S. PATENT DOCUMENTS

| | | | |
|---|---|---|---|
| 590,756 | 9/1897 | Greene | 43/88 |
| 1,024,689 | 4/1912 | Lundstrom | 43/88 |
| 1,135,052 | 4/1915 | Russell | 43/94 |
| 1,253,886 | 1/1918 | Regal | 43/93 |
| 3,760,530 | 9/1973 | Dahlgren | 43/88 |

Primary Examiner—Gary L. Smith
Assistant Examiner—Robert P. Olszewski
Attorney, Agent, or Firm—Beveridge, DeGrandi, Kline & Lunsford

[57] ABSTRACT

An animal trap has two legs that are urged together by a spring, but are prevented from such movement by a pivotable cap on the end of one leg when the trap is set. A tongue mounted on a sleeve on the same leg as the cap prevents the cap from pivoting until an animal rotates the sleeve by displacing a trigger arm mounted on the sleeve. The cap has a convex tab which coacts with the flat tongue to permit the trap to be tripped even upon an incomplete rotation of the sleeve by the animal.

13 Claims, 4 Drawing Figures

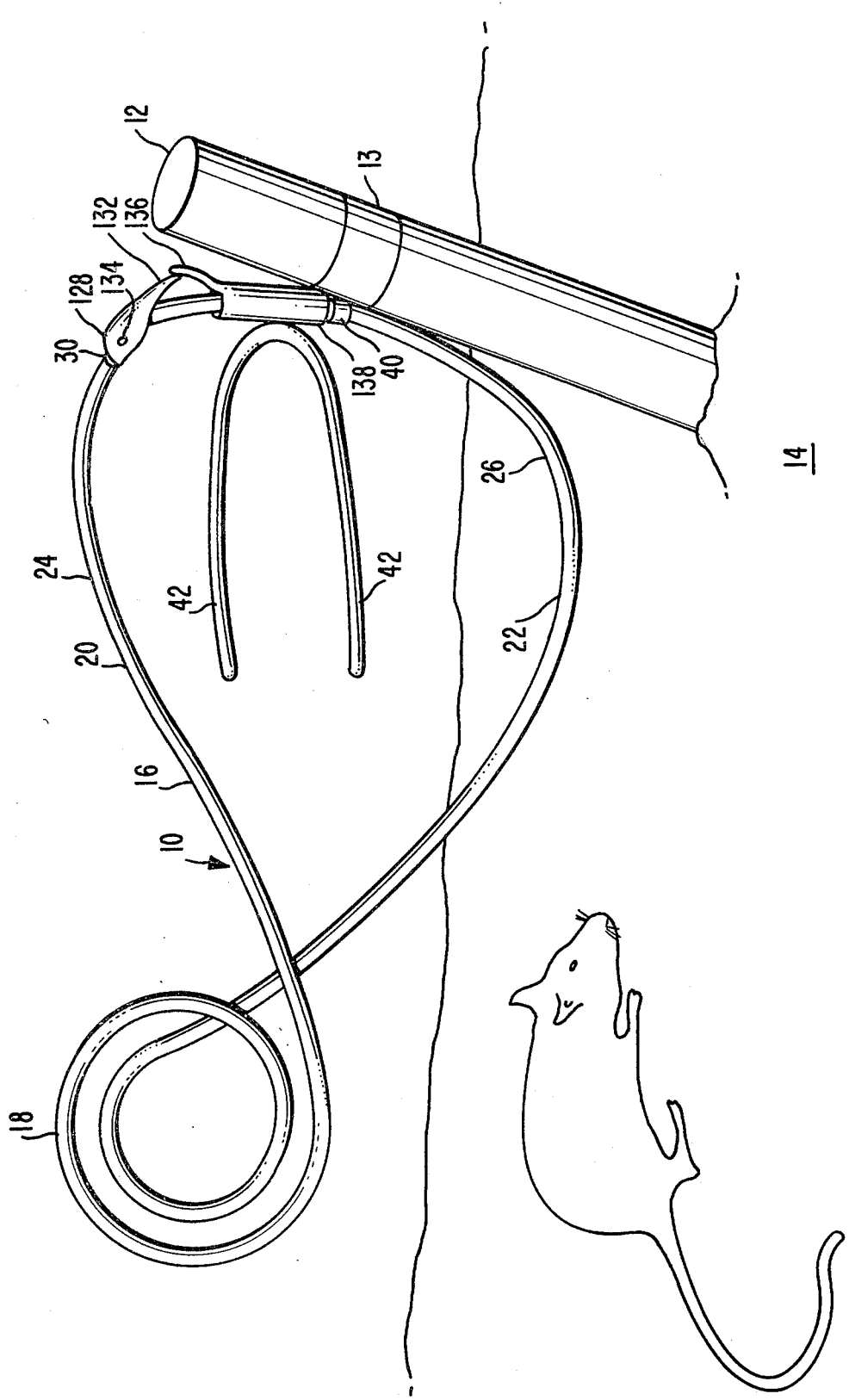

ANIMAL TRAP AND TRIGGER MECHANISM

BACKGROUND OF THE INVENTION

The present invention relates to animal traps and trigger mechanisms therefor.

Animal traps have been manufactured in one fashion or another for centuries; however, the need persists for an animal trap that is inexpensive, reliable and convenient. Applicant is aware of various devices shown in U.S. Pat. Nos. issued to Hallidie, 326,864, Ellis, 1,058,355, Caryl, 3,408,765; and Dahlgren, 3,760,530. While these devices rely upon spring-type devices to urge trapping legs together to bind the animal, none of them suggests the structure of the present invention.

The present invention provides a very sensitive tripping mechanism which the art has always needed. Animals often learn that the traps exist and that they are in some way dangerous to them. Once the animals discover the existence of the device they approach them only tentatively, if at all. Hence in order to trap such a wary animal it is necessary to have a device such as the present one which will respond to a tentative tripping. Further, an animal may accidentally run into an undiscovered trap, and unless a sensitive trap, such as the present one, is employed the tripping force of the tampering may be insufficient to cause the animal to spring the trap. Thus, in order to increase the chances of trapping the victim, the present sensitive trap and tripping mechanism is required.

SUMMARY OF THE INVENTION

The present invention aids in fulfilling this need in the art by providing an animal trap having first and second legs, each having first and second ends, a spring proximate the first ends of the first and second legs for urging the legs together, a blocking means capable of maintaining the legs in spaced apart relation wherein the blocking means is mounted on the second end of the first leg and is movable from a first position to a second position, the first position preventing the legs from moving together and the second position allowing such movement, and a sleeve rotatably mounted on the first leg and having a trigger arm transverse to the sleeve, the sleeve rotatable from a first orientation to a second orientation in response to an animal moving the trigger arm, the fist orientation preventing the movement of the blocking means from the first position to the second position and the second orientation allowing such movement.

The invention includes a tripping mechanism for an animal trap having first and second legs that are urged together wherein the tripping mechanism includes blocking means capable of maintaining the legs in spaced apart relation, the blocking means mounted on the first leg and movable from a first position to a second position, the first position preventing the legs from moving together and the second position allowing such movement, a sleeve rotatably mounted on the first leg and having a trigger arm transverse to the sleeve, the sleeve being rotatable from a first orientation to a second orientation in response to an animal moving the trigger arm, the first orientation preventing the movement of the blocking means from the first position to the second position and the second orientation allowing such movement.

Applicant's invention provides a trap that is very sensitive, particularly when constructed in the preferred embodiment. In the preferred embodiment, the movement of the trigger, which allows the trapping legs to snap together, requires less and less tripping force as the trigger is further dislodged from the set position by the victim animal. Thus, an animal which only tentatively displaces the trigger mechanism is more likely to be caught by a trap using the present invention than by previous traps.

Thus, in the preferred embodiment of both the animal trap and the tripping mechanism, the blocking means has a lip for engaging the second end of the second leg to prevent the legs from moving together when the blocking means is in the first position and a tab substantially othogonal to the lip, and the sleeve has a tongue substantially parallel to the tab. The tab is between the tongue and the first leg with the tab having a convex surface facing the tongue and the tongue having a substantially flat surface facing the tab when the blocking means is in the first position and the sleeve is oriented at the first orientation.

In a more preferred embodiment, the tongue is radially displaced from the first leg so that the tongue subtends a relatively small angle with respect to the axis of rotation of the sleeve.

BRIEF DESCRIPTION OF THE DRAWINGS

This invention will be more readily understood by a thorough reading of the following specification along with a study of the accompanying drawings in which like parts have like reference numerals, and in which:

FIG. 4 is a view similar to that of FIG. 1 showing a more preferred embodiment of the invention.

DETAILED DESCRIPTION

The present invention aids in fulfilling the need in the art of providing an animal trap having a pair of legs, a spring to urge the legs together, a pivotable cap on one of the legs which prevents the legs from moving together when the trap is set, a sleeve rotatably mounted on the same leg as the cap to maintain the cap in set position, a trigger arm so mounted on the sleeve that the victim animal will strike the trigger arm and rotate the sleeve upon entering the opening between the legs, and a mounting ring for attaching the trap to a wooden post. In the preferred embodiment, the cap, which is prevented from pivoting by the sleeve when the trap is set, is provided with a convex tab engaging a flat tongue on the sleeve to hold the cap in set position. As the animal strikes the trigger arm to only slightly rotate the sleeve, the tongue rotates to a position where it engages the radially inward portion of the curve of the tab. The bias of the spring causes the cap to begin to pivot by an amount determined by the amount of curvature of the convex tab. The contact of the convex tab against the flat tongue imparts a torque to the tongue and sleeve to urge their further rotation. The result is the enhanced sensitivity of the trigger mechanism.

Figure 1:
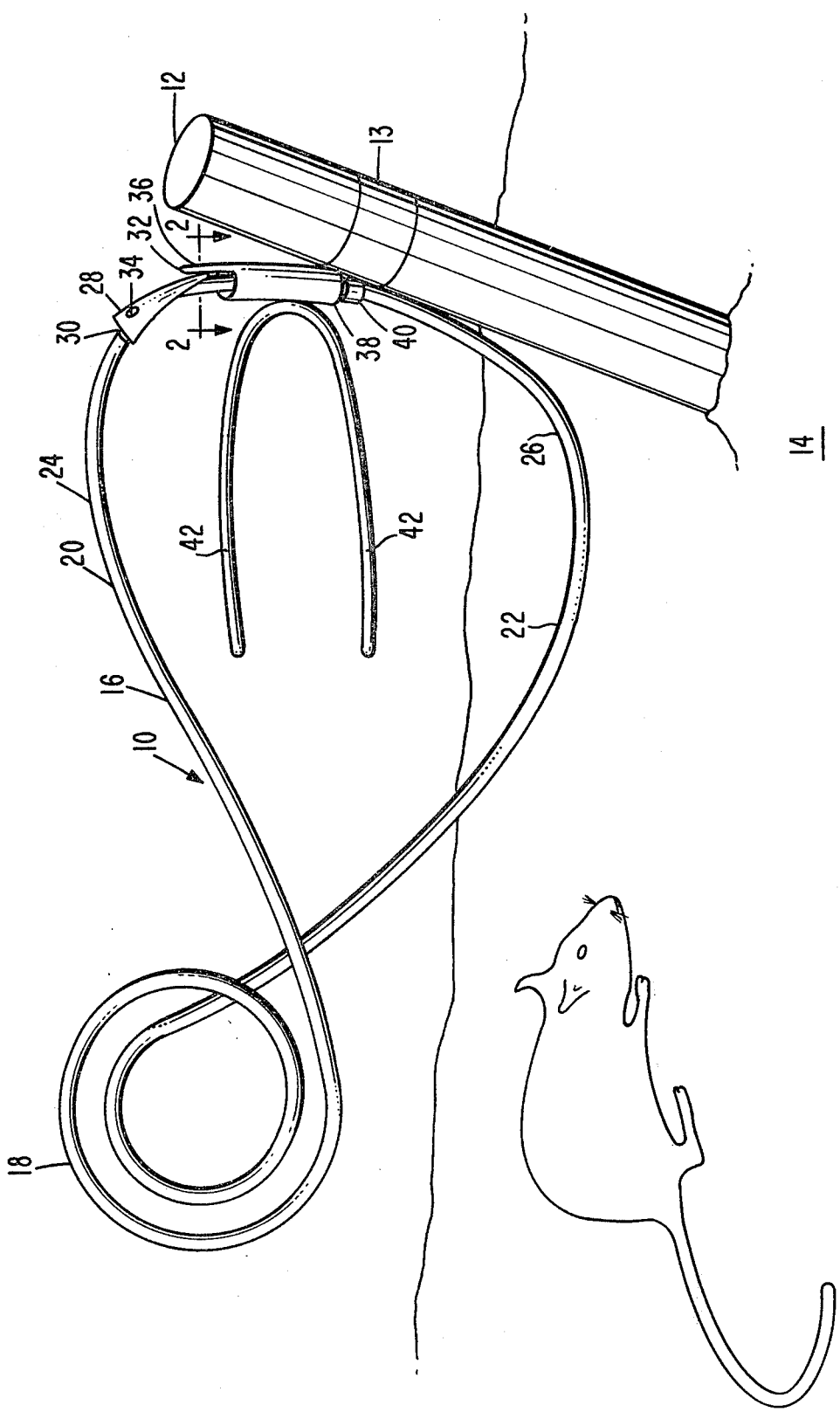
FIG. 1 shows the trap and tripping mechanism of this invention mounted and set, ready to trap a victim animal.

The animal trap 10 of the present invention is shown in FIG. 1, mounted upon a post 12 by joining ring 13.

Post 12 is embedded in ground 14. Other mounting methods for the trap will be apparent to those of ordinary skill in the art.

The spring 18 and legs 20 and 22 of trap 10 are preferably made of a stiff spring wire, such as annealed or hard drawn wire, bent to the desired shape so that when the trap is set, there will be a high degree of tension tending to snap the legs together. By such construction, spring 18 may be made as a coil spring which will provide such a degree of tension. Legs 20 and 22 can, of course, be manufactured to be of any suitable shape for trapping various sizes and species of animals as will be apparent to those of skill in the art. When tripped, legs 20 and 22 snap together so as to intersect along their curved portions 24 and 26. The snapping shut of legs 20 and 22, thus crushes, traps, and usually kills an animal which is in the opening between the legs when the trap is sprung.

Legs 20 and 22 are prevented from moving together when the trap is set by a blocking means, such as cap 28, which is provided with a lip 30 and a tab 32. Cap 28 is pivotably mounted on the end of leg 22 by a cotter pin or other hinging connector 34. Cap 28 is prevented from pivoting from the position shown in FIG. 1 by tongue 36 mounted on sleeve 38, which is rotatably mounted on leg 22. Collar 40 secures joining ring 13 to leg 22 and maintains sleeve 38 at the proper axial position along leg 22. Sleeve 38 is provided with trigger arms or wires 42. When the trap is set, the trigger arms 42 extend into the opening between legs 20 and 22.

When an animal enters the opening between legs 20 and 22 from either direction, it will move trigger arm 42 and rotate sleeve 38, and thereby displace tongue 36 from a blocking to an unblocking orientation relative to tab 32. The unblocking of tab 32 allows cap 28 to pivot allowing leg 20 to snap towards leg 22 ensnaring the victim therebetween.

Figure 2:
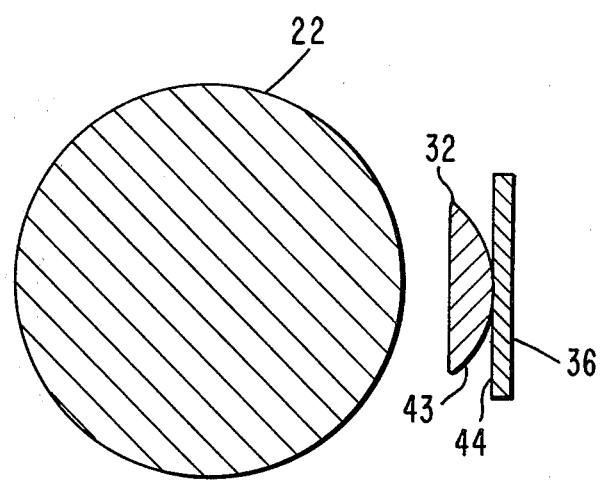
FIG. 2 is a sectional view of the tripping mechanism of this invention taken along line II—II of FIG. 1.
Figure 3:
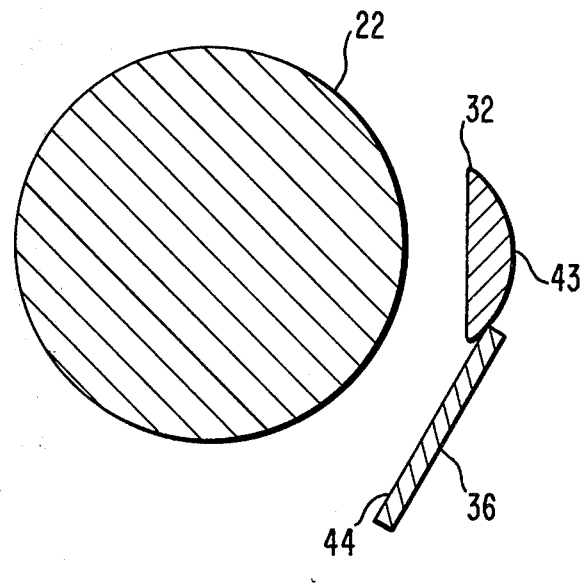
FIG. 3 is a sectional view as shown in FIG. 2, showing the relative position of the tripping mechanism as the trigger is partially dislodged.

The great sensitivity of the tripping mechanism of the present invention can be seen by closer examination of the schematic views of the mechanism shown in FIGS. 2 and 3. In FIG. 2, leg 22, tab 32 and tongue 36 can be seen in cross-sectional view. Tab 32 is provided with a convex surface 43 having the radius of curvature substantially less than the distance between the point of contact of tab 32 and tongue 36 and the center of leg 22. The convex surface 43 of tab 32 is urged against the flat inner surface 44 of tongue 36 by the action of spring 18 and the pivotable mounting of cap 28. As the displacement of trigger arm 42 causes the rotation of sleeve 38, tongue 36 is displaced circumferentially around leg 22, as shown in FIG. 3. Tab 32 moves away from leg 22 as the flat surface 44 contacts the lower portion of convex surface 43. The force exerted by spring 18 acting through the curved surface 43 of tab 32 encourages the further rotation of tongue 36. This further rotation contributes to the complete tripping of the device, even if the arm 42 is not sufficiently displaced by the force exerted by the victim animal. Thus, the heightened sensitivity of the tripping mechanism of the present invention can be readily observed. It is understood that, if desired, inner surface 44 of tongue 36 may be made convex to even further increase the sensitivity of the tripping mechanism. It may also be made concave in order to provide a less sensitive device, requiring an initial tripping force great enough to overcome the effect of spring 18 until the tongue clears the center of tab 32, after which time the spring 18 will act to encourage tripping.

It will be appreciated that by mounting sleeve 38 for free rotation about leg 22, the trap can be sprung by an animal entering the opening from either side to displace tripping arm 42 in either direction.

On the most preferred embodiment, shown in FIG. 4, the tongue 136 is displaced radially from leg 22 When the trap is set, tongue 136 and tab 132 engage at a point spaced from the axis of rotation of sleeve 138. Thus, the angle subtended by tongue 136 with respect to the axis of rotation of sleeve 138 is less than the comparable angle subtended by tongue 36 of the embodiment of FIG. 1. Hence the sleeve 138 in FIG. 4 need not rotate through as large an angle to allow cap 128 to pivot as the sleeve 38 of FIG. 1. The tripping of the embodiment of FIG. 4 is accomplished by a lesser displacement of trigger arm 42 than would be required in the embodiment of FIG. 1. Thus the sensitivity is further increased.

Thus, the trap and tripping mechanism of the present invention provide a sensitive and effective apparatus for ensnaring animals which only slightly trip the mechanism. The trap, of course, can be employed to rid the user thereof of pests such as rodents, or to catch game or other animals.

Since various modifications can be made in my invention as hereinabove described and many apparently widely different embodiments of same within the spirit and scope of the claims without departing from such spirit and scope, it is intended that all matter contained in the specification shall be interpreted as illustrative only and not in a limiting sense.

I claim:
1. An animal trap comprising:
  first and second legs each having first and second ends,
  spring means proximate said first ends of said first and second legs for urging said legs together,
  a blocking means capable of maintaining said legs in spaced apart relation, wherein said blocking means is mounted on said second end of said first leg and is movable from a first position to a second position, said first position preventing said legs from moving together and said second position allowing such movement, and
  a sleeve rotatably mounted on said first leg and having a trigger arm transverse to said sleeve, said sleeve rotatable from a first orientation to a second orientation in response to an animal moving said trigger arm, said first orientation preventing the movement of said blocking means from said first position to said second position and said second orientation allowing such movement.

2. An animal trap as claimed in claim 1 wherein said legs and said spring are integrally formed of stiff spring rod wherein said legs each have a mid porion between said ends, and wherein said trap is set, said blocking means is in said first position, said mid portions of said legs are separated and prevented from moving together by said blocking means, thereby defining an opening therebetween, and said trigger arm is positioned within said opening.

3. An animal trap as claimed in claim 1 wherein said blocking means is pivotable about an axis orthogonal to said second end of said first leg from said first position to said second position.

4. An animal trap as claimed in claim 3 wherein said blocking means has a lip for engaging said second end of said second leg to prevent said legs from moving together when said blocking means is in said first position, and a tab substantially orthogonal to said lip;

said sleeve has a tongue substantially parallel to said tab; and said tab is between said tongue and said first leg when said blocking means is in said first position and said sleeve is oriented at said first orientation.

5. An animal trap as claimed in claim 4 wherein said tab has a convex surface facing said tongue and said tongue has a substantially flat surface facing said tab when said blocking means is in said first position and said sleeve is oriented at said first orientation.

6. An animal trap as claimed in claim 2, 3, 4, or 5, wherein said spring means is a coil spring connected to said first ends of said first and second legs.

7. An animal trap as claimed in claim 4 or 5 wherein said tongue is radially displaced from said first leg so that said tongue subtends a relatively small angle with respect to the axis of rotation of said sleeve.

8. A tripping mechanism for an animal trap having first and second legs that are urged together, said tripping mechanism comprising blocking means capable of maintaining said legs in spaced apart relation, wherein said blocking means is mounted on said first leg movable from a first position to a second position, said first position preventing said legs from moving together and said second position allowing such movement, a sleeve rotatably mounted on said first leg and having a trigger arm transverse to said sleeve, said sleeve rotatable from a first orientation to a second orientation in response to an animal moving said trigger arm, said first orientation preventing the movement of said blocking means from said first position to said second position and said second orientation allowing such movement.

9. A tripping mechanism as claimed in claim 8 wherein when said mechanism is set, said blocking means is in said first position, said sleeve is in said first orientation, said legs are separated and prevented from moving together by said blocking means, thereby defining an opening therebetween, and said trigger arm is positioned within said opening.

10. A tripping mechanism as claimed in claim 9 wherein said blocking means is pivotable about an axis orthogonal to said first leg from said first position to said second position.

11. A tripping mechanism as claimed in claim 10 wherein said blocking means has a lip for engaging said second leg to prevent said legs from moving together when said blocking means is in said first position an a tab substantially orthogonal to said leg, said sleeve has a tongue substantially parallel to said tab, and said tab is between said tongue and said first leg when said blocking means is in said first position and said sleeve is oriented at said first orientation.

12. A tripping mechanism as claimed in claim 11 wherein said tab has a convex surface facing said tongue and said tongue has a substantially flat surface facing said tab when said blocking means is in said first position and said sleeve is oriented at said first orientation.

13. A tripping mechanism as claimed in claim 11 or 12 wherein said tongue is radially displaced from said first leg so that said tongue subtends a relatively small angle with respect to the axis of rotation of said sleeve.

* * * * *

UNITED STATES PATENT AND TRADEMARK OFFICE
CERTIFICATE OF CORRECTION

PATENT NO. : 4,270,300
DATED : June 2, 1981
INVENTOR(S) : Daryl A. Schultz

It is certified that error appears in the above—identified patent and that said Letters Patent is hereby corrected as shown below:

Column 1, line 47, change "fist" to -- first --.

Column 2, line 14, change "othogonal" to -- orthogonal --.

Column 4, line 55, change "porion" to -- portion --.

Column 4, line 56, after "wherein" insert -- when --.

Column 6, line 17, change "an" to -- and --.

Signed and Sealed this

Fifteenth Day of September 1981

[SEAL]

Attest:

Attesting Officer

GERALD J. MOSSINGHOFF

Commissioner of Patents and Trademarks